Patented Jan. 23, 1940

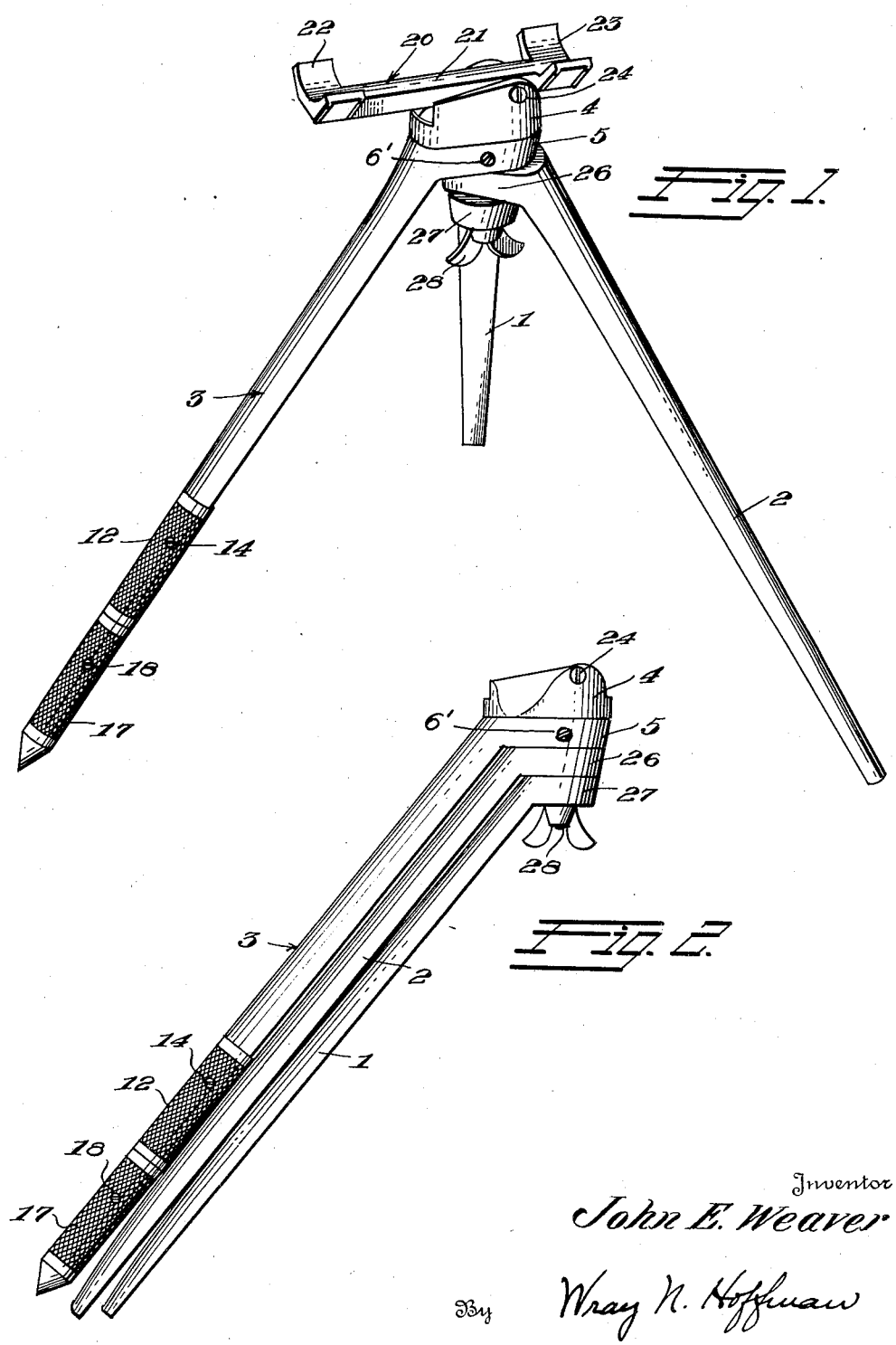

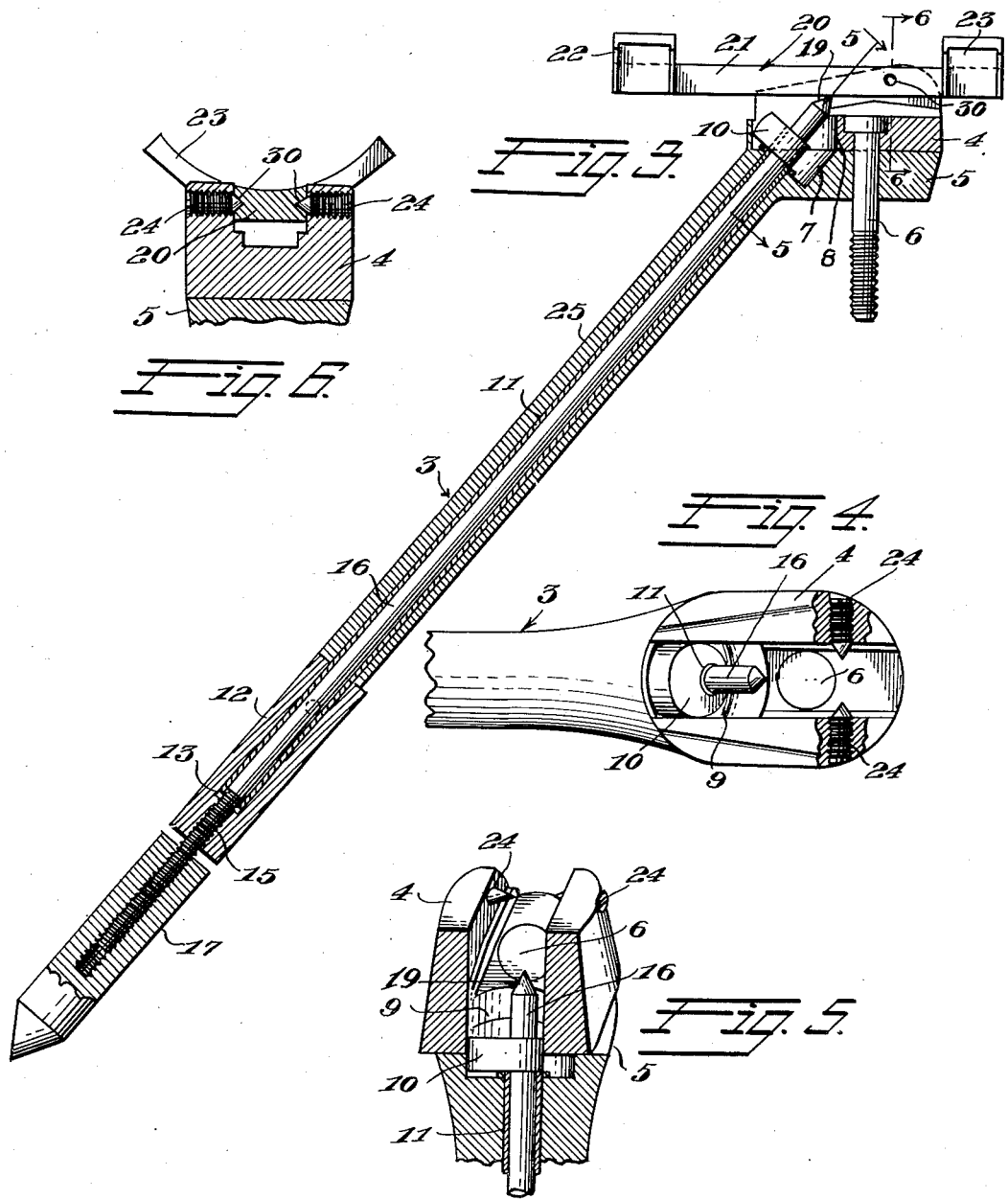

2,188,237

UNITED STATES PATENT OFFICE 2,188,237

TRIPOD SUPPORT

John E. Weaver, Flint, Mich.

Application August 17, 1938, Serial No. 225,458

6 Claims. (Cl. 248—168)

This invention relates to a tripod support, and more particularly to a support for use in conjunction with a telescope or other instrument.

An object of the present invention is to provide a tripod support wherein the means for supporting a telescope or similar instrument may be adjusted either vertically or laterally or both vertically and laterally without altering the position of the legs.

Another object of the present invention is to provide a tripod support for supporting a telescope or similar instrument which is simple and compact in structure, and which may with ease be shifted either to operative position or to collapsed and inoperative position.

A further object of the present invention is to provide a tripod support wherein the meeting ends of the rear or trail leg and the pair of front legs are arranged in superimposed relation with the meeting end of the trail leg being situated above the meeting ends of the front legs.

A still further object of the present invention is to provide a tripod support wherein the means for supporting a telescope or similar instrument is movable either vertically or laterally or both vertically and laterally by means operable from the rear or trail leg.

Other objects and advantages will be apparent as the invention is described in greater detail in connection with the accompanying drawings wherein Figure 1 is a perspective view of the tripod support according to the present invention in operative position.

Figure 2 is a side elevational view of the tripod structure according to the present invention in collapsed and inoperative position with the cradle removed.

Figure 3 is a side elevational view partly in section, showing the structure of the head, the rear or trail leg, and the operating mechanism therefor.

Figure 4 is a plan view partly in section of the head shown in Figure 2.

Figure 5 is a transverse section on line 5—5 of Figure 3.

Figure 6 is a transverse section on line 6—6 of Figure 3.

Referring to the drawings the tripod support consists of a pair of front legs 1 and 2 and a rear or trail leg 3. In the preferred form, the legs are semi-circular shaped in cross-section and are assembled with the flat side disposed underneath towards the ground.

The head of the tripod is constituted by a yoke member 4 which is pivotally mounted upon the top of a bearing collar 5 carried by the meeting or upper end of the rear or trail leg 3 by means of a pin 6. The pin 6 is secured to the bearing collar 5 and locked against rotation by means of a set screw 6'. As shown in Figures 3 and 4, the member 4 is provided with an elongated opening 8 adjacent an end thereof which is in bridging relation with a V-shaped cut out segment or notch 7 in the top surface of the collar 5, thereby forming a confined space 9. Mounted within such space so as to coact with the walls thereof is a cam 10 carried by an end of a sleeve 11 extending up through the rear or trail leg 3. The other end of the sleeve carries a knurled nut 12 for rotating the sleeve 11 and cam 10 in either direction. Surrounding the sleeve 11 above the nut 12 is a housing 25. As shown in Figure 3, the lower end of the sleeve 11 bears against a shoulder 13 in the nut 12 and the nut is locked to the sleeve by means of set screw 14. The nut 12 is also provided at its lower end with a threaded opening 15 for the purpose to be subsequently described.

Extending through the sleeve 11 and terminating in the rear or trail leg 3 is a rod 16. As clearly shown in Figure 3, the lower end of the rod 16 is threaded for a portion of its length and is in threaded engagement with the threaded opening 15 in the knurled nut 12. In threaded engagement with the lower end of such rod is a knurled nut 17 which is so formed as to form the bottom portion of the rear or trail leg 3; the nut 17 being locked to the rod 16 by means of a set screw 18. The upper end of the rod 16 is provided with a pointed head 19 which as adapted to contact with the bottom of a cradle 20 and move same upwardly or downwardly depending upon the direction in which the rod 16 is rotated by means of the knurled nut 17.

The cradle 20 supports a telescope or like instrument and comprises a bottom plate 21 having V-shaped brackets 22 and 23 secured to the ends thereof. The bottom plate 21 is provided on its opposed sides with conical shaped indentations 30 which receive the pointed screw pins 24 carried by the yoke member 4.

The front leg 2 is provided with a bearing collar 26 at its meeting end which collar is rotatably mounted upon the pin 6 depending from the collar 5 of the rear or trail leg 3. The other front leg 1 is likewise provided with a bearing collar 27 at its meeting end which is likewise rotatably mounted upon the pin 6. The bearing collars 26 and 27 are maintained in assembled relation by means of wing nut 28.

In operation of the apparatus thus described, the leg 1 and collar 27 are rotated until the leg is moved to its position for use, whereupon the leg 2 and collar 26 are likewise rotated until the leg 2 has been moved to its operative position. The wing nut 28 is then turned in the proper direction to lock the collars 27 and 26 against movement. With the completion of the rotation and the turning of the wing nut, the legs 1 and 2, and the rear or trail leg 3 are in the open or operative position shown in Figure 1. The bottom plate 21 of the cradle 20 is then positioned so that the conical indentations 30 are in alignment with the pointed pins 24, whereupon the pins 24 are rotated until they are in gripping engagement with their complemental indentation 30.

The telescope or similar instrument is then placed on the cradle 20. In order to bring the telescope or similar instrument within the desired range of vision, the knurled nut 12 is turned in the proper direction to thereby shift the cradle laterally. The turning of the nut 12 causes the sleeve 11 and cam 10 to be rotated and with the rotation of the cam the yoke member 4 is caused to travel in an arcuate path transversely, thereby moving the cradle laterally either to the right or left depending upon the direction of rotation of the cam. As shown in Figure 5, movement of the cam in counterclockwise direction is limited by engagement of the cam with one lateral wall of the notch 7 and in like manner clockwise movement thereof is limited by engagement of the cam with the opposite lateral wall of said notch so that the walls of the notch 7 coact with the cam to define the opposite extreme limits of movement of the yoke member 4 which is operated by the cam hereinabove described. Furthermore, if the cam is rotated only to a point which is intermediate its extreme outermost positions the peripheral surface of the cam by engagement with the walls of the elongated opening 8 in the yoke member 4 will hold the latter against movement in any desired position of adjustment.

If it is necessary to either raise or lower the cradle in order to bring the telescope or like instrument to the proper range of vision, the knurled nut 17 is turned in the proper direction to thereby tilt the cradle vertically. The rotation of the nut 17 causes the rod 16 to move upwardly or downwardly depending upon the direction of rotation. As the pointed head 19 is in contact with the under surface of the bottom plate 21 of the cradle 20, the movement of the pointed head 19 upwardly or downwardly causes the cradle 20 to be tilted in a vertical plane about the pivot pins 24.

It will be understood from the above description that the tripod support of the present invention has many advantageous features. One of these features is the fact that the legs of the tripod support can be set at any desired angular relation to each other, the degree of angular relation depending upon the desires of the individual shooter as suits his physique and shooting style. In tripod supports wherein the legs are not so adjustable the legs are ofttimes in the way of the shooter's elbow when in the prone position for rifle shooting.

Another advantageous feature of the present invention is that the cradle carrying the telescope may be adjusted both vertically and laterally by mechanism which is operable by the fingers of one hand only of the shooter. This is of especial importance because a shooter when in the prone position has only one hand free to make any needed adjustments to his spotting scope.

Another advantageous feature of the present invention is that the tripod support is so constructed that all adjustments may be made with the fingers of one hand while that hand is resting on the ground or other supporting plane on which the tripod support may be placed. In addition, the tripod support is so constructed that all adjustments may be made with the fingers of one hand without moving that hand from one position to another.

Another advantageous feature of the present invention is that the tripod support is so constructed that the supported instrument may be firmly attached to the tripod support and yet be easily and quickly removed from it. Moreover, the structure of the tripod support is such that it is rigid and free from vibration in the wind and yet light in weight.

It is to be noted that the tripod support thus described is designed primarily for use in supporting a telescope for spotting shot holes in a rifle or pistol target such as is used in tournament shooting. Besides, its structure is such that it may be folded into a neat and compact form so as to be easily carried in a shooting kit.

It will be understood that the tripod support may be constructed and arranged as best suited to meet the requirements of use and that, except as pointed out in the accompanying claims, the invention is not restricted to the particular construction and arrangement shown and described herein.

Having fully described the invention, what I claim as new and desire to secure by Letters Patent is:

1. In a tripod support, a trail leg, a member mounted on said trail leg for movement transversely with respect thereto, cam means carried by said trail leg and coacting with said member to impart transverse movement to said member, a cradle mounted on said member for supporting a telescope and means on said trail leg and operatively connected to said cradle for adjusting same in a vertical plane.

2. In a tripod support, a trail leg, a member mounted on said trail leg for movement transversely with respect thereto, a cam carried by said trail leg and coacting with said member to impart transverse movement to said member, and means on said trail leg cooperating with said cam to limit the operative range of movement thereof.

3. In a tripod support, a trail leg, a member mounted on said trail leg for movement transversely with respect thereto, said member being provided with an elongated opening, a cam carried by said trail leg and coacting with the opposed walls of said opening to impart transverse movement to said member in either direction, and means on said trail leg cooperating with said cam to limit the operative range of movement thereof.

4. In a tripod support, a trail leg having a collar at its upper end, a yoke member carried by the top of said collar and mounted for movement transversely, said yoke member being provided with an elongated opening, a cradle for supporting a telescope or like instrument mounted on said yoke member, a sleeve in said trail leg, a cam carried by an end of said sleeve coacting with the opposed walls of said opening to impart transverse movement to said yoke member in either direction, and means carried by the other end of said sleeve for rotating said sleeve in either direction to thereby move said yoke member laterally.

5. In a tripod support, a trail leg having a collar at its upper end, said collar being provided with a notch, a yoke member carried by the top of said collar and mounted for movement transversely, said yoke member being provided with an elongated opening, a cradle for supporting a telescope or like instrument mounted on said yoke member, a sleeve in said trail leg, a cam carried by an end of said sleeve coacting with the opposed walls of said opening to impart transverse movement to said yoke member in either direction, and means carried by the other end of said sleeve for rotating said sleeve in either direction to thereby move said yoke member laterally, said notch cooperating with said cam to limit the operative range of movement thereof.

6. In a tripod support, a trail leg having a collar at its upper end, a yoke member carried by the top of said collar and mounted for movement transversely, said yoke member being provided with an elongated opening, a cradle for supporting a telescope or like instrument mounted on said yoke member, a sleeve in said trail leg, a cam carried by an end of said sleeve coacting with the opposed walls of said opening to impart transverse movement to said yoke member in either direction, means carried by the other end of said sleeve for rotating said sleeve in either direction to thereby move said yoke member laterally, a rod in said trail leg and extending through said sleeve and having an end adapted to contact with said cradle, and means carried by the other end of said rod and forming the bottom portion of said leg for rotating said rod in either direction to thereby effect vertical adjustment of said cradle.

JOHN E. WEAVER.